US007860826B2

(12) United States Patent
Freedman et al.

(10) Patent No.: US 7,860,826 B2
(45) Date of Patent: Dec. 28, 2010

(54) METHOD AND SYSTEM FOR USING GLOBAL EQUIVALENCY SETS TO IDENTIFY DATA DURING PEER-TO-PEER SYNCHRONIZATION

(75) Inventors: Gordie Freedman, Palo Alto, CA (US); Bruce D. Nilo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 11/462,676

(22) Filed: Aug. 4, 2006

(65) Prior Publication Data
US 2008/0034009 A1 Feb. 7, 2008

(51) Int. Cl.
*G06F 7/00* (2006.01)
*G06F 17/00* (2006.01)

(52) U.S. Cl. .................. 707/610; 707/611; 707/620

(58) Field of Classification Search ................ None
See application file for complete search history.

(56) References Cited

U.S. PATENT DOCUMENTS

| 4,792,909 | A | | 12/1988 | Serlet |
| 5,287,496 | A | | 2/1994 | Chen et al. |
| 5,355,483 | A | | 10/1994 | Serlet |
| 5,481,721 | A | | 1/1996 | Serlet et al. |
| 5,490,246 | A | | 2/1996 | Brotsky et al. |
| 5,687,370 | A | | 11/1997 | Garst et al. |
| 5,710,900 | A | | 1/1998 | Anand et al. |
| 5,710,922 | A | * | 1/1998 | Alley et al. .......... 707/201 |
| 5,727,202 | A | | 3/1998 | Kucala |
| 5,758,358 | A | | 5/1998 | Ebbo |
| 5,832,489 | A | | 11/1998 | Kucala |
| 5,884,323 | A | | 3/1999 | Hawkins et al. |
| 5,946,689 | A | | 8/1999 | Yanaka et al. |

(Continued)

FOREIGN PATENT DOCUMENTS

EP 0 694 879 A2 1/1996

(Continued)

OTHER PUBLICATIONS

Abuan et al.; U.S. Appl. No. 10/769,841, filed Feb. 2, 2004.

(Continued)

*Primary Examiner*—Khanh B Pham
*Assistant Examiner*—Azam Cheema
(74) *Attorney, Agent, or Firm*—Wong, Cabello, Lutsch, Rutherford & Brucculeri LLP

(57) ABSTRACT

Systems and methods for synchronization including the use of a global equivalency identification datum or set of datum. A universally unique identification datum may be associated with each independently created associated data set. In some embodiments, a synchronization server software element may be responsible for maintaining synchronization for a plurality of clients, including software elements or devices. A record believed to be new by the software elements may verify that the record is actually new. In some embodiments, verification of the record's newness involves assuming that the local ID is a global identification datum and comparing that datum to the all the sets of datum that the Sync-Server knows about. The synchronization server software element may use a table to hold information for all of the records known to that element. In some embodiments these records may have been deleted in the past.

37 Claims, 7 Drawing Sheets

U.S. PATENT DOCUMENTS

| | | | |
|---|---|---|---|
| 5,948,055 A * | 9/1999 | Pulsipher et al. | 709/202 |
| 5,991,771 A | 11/1999 | Falls et al. | |
| 6,000,000 A | 12/1999 | Hawkins et al. | |
| 6,006,231 A | 12/1999 | Popa | |
| 6,006,274 A | 12/1999 | Hawkins et al. | |
| 6,026,415 A | 2/2000 | Garst et al. | |
| 6,188,995 B1 | 2/2001 | Garst et al. | |
| 6,212,529 B1 * | 4/2001 | Boothby et al. | 707/201 |
| 6,272,558 B1 | 8/2001 | Hui et al. | |
| 6,295,541 B1 | 9/2001 | Bodnar et al. | |
| 6,304,884 B1 | 10/2001 | Garst et al. | |
| 6,308,201 B1 | 10/2001 | Pivowar et al. | |
| 6,330,618 B1 | 12/2001 | Hawkins et al. | |
| 6,360,272 B1 | 3/2002 | Lincke et al. | |
| 6,401,112 B1 | 6/2002 | Boyer et al. | |
| 6,457,062 B1 | 9/2002 | Pivowar et al. | |
| 6,505,215 B1 | 1/2003 | Kruglikov et al. | |
| 6,516,327 B1 | 2/2003 | Zondervan et al. | |
| 6,553,037 B1 | 4/2003 | Pivowar et al. | |
| 6,571,262 B2 | 5/2003 | Garst et al. | |
| 6,717,599 B1 | 4/2004 | Olano | |
| 6,839,564 B2 * | 1/2005 | Sutinen et al. | 455/502 |
| 6,925,477 B1 | 8/2005 | Champagne et al. | |
| 7,113,963 B1 * | 9/2006 | McCaw | 707/204 |
| 7,370,044 B2 * | 5/2008 | Mulhern et al. | 707/6 |
| 7,490,112 B1 * | 2/2009 | Suresh et al. | 707/201 |
| 2002/0049764 A1 | 4/2002 | Boothby et al. | |
| 2003/0093431 A1 | 5/2003 | Cooke et al. | |
| 2003/0131004 A1 | 7/2003 | Krishna et al. | |
| 2003/0220966 A1 * | 11/2003 | Hepper et al. | 709/203 |
| 2004/0078393 A1 * | 4/2004 | Acree et al. | 707/200 |
| 2004/0214926 A1 | 10/2004 | Bittner | |
| 2006/0031587 A1 | 2/2006 | Paterson et al. | |
| 2006/0041603 A1 | 2/2006 | Paterson et al. | |
| 2006/0066588 A1 | 3/2006 | Lyon et al. | |
| 2006/0069809 A1 | 3/2006 | Serlet | |
| 2006/0288053 A1 | 12/2006 | Holt et al. | |
| 2008/0034009 A1 | 2/2008 | Freedman et al. | |
| 2008/0165807 A1 | 7/2008 | Nilo et al. | |
| 2008/0168183 A1 | 7/2008 | Marcy et al. | |
| 2009/0055434 A1 * | 2/2009 | Chasman et al. | 707/103 R |

FOREIGN PATENT DOCUMENTS

| | | |
|---|---|---|
| EP | 1 383 080 A1 | 1/2004 |
| WO | WO 98/45815 A1 | 10/1998 |
| WO | WO 01/06364 A2 | 1/2001 |
| WO | WO 2005/112388 A1 | 11/2005 |

OTHER PUBLICATIONS

Demers et al.; "Epidemic Algorithms for Replicated Database Maintenance;" Xerox Palo Alto Research Center; (c) 1987.

Patent Cooperation Treaty International Search Report received in International Application No. PCT/US2005/022930 mailed Oct. 27, 2005.

Patent Cooperation Treaty International Search Report received in International Application No. PCT/US2005/022930 mailed Oct. 27, 2005.

Babaoğlu et al.; "Consistent Global States of Distributed Systems: Fundamental Concepts and Mechanisms;" Technical Report UBLCS-93-1; Jan. 1993; Laboratory for Computer Science University of Bologna.

Holt; "Apparatus and Method for Peer-To-Peer N-Way Synchronization in a Decentralized Environment," U.S. Appl. No. 11/157,647, filed Jun. 21, 2005.

* cited by examiner

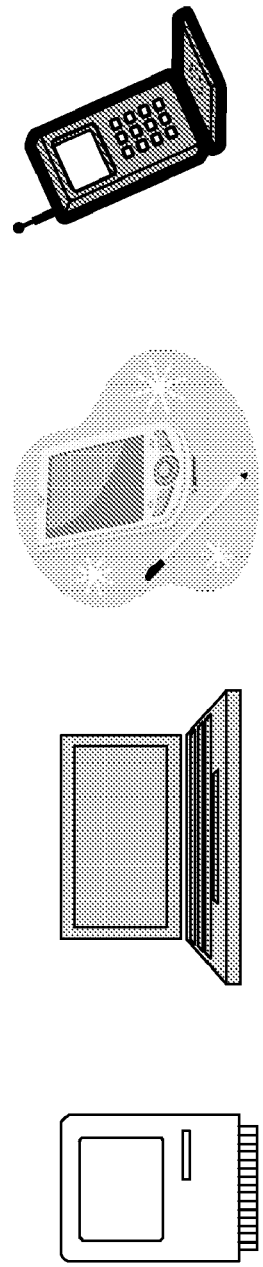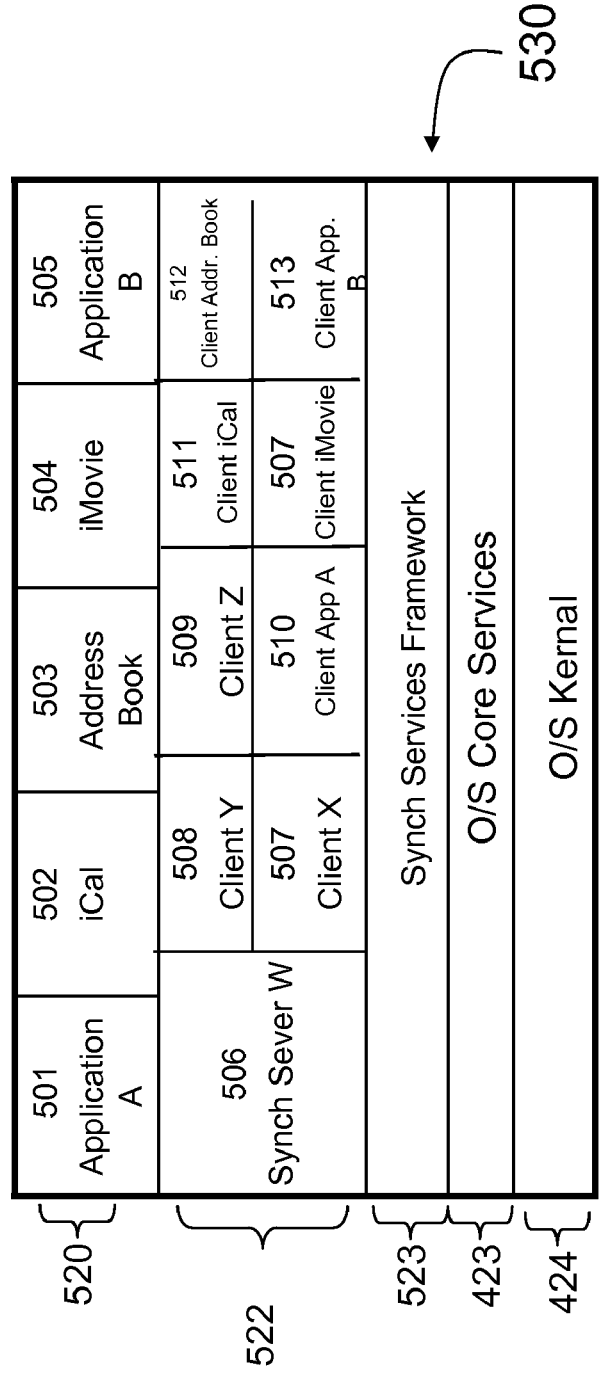
FIGURE 5

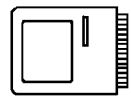
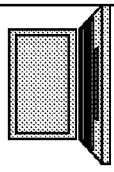
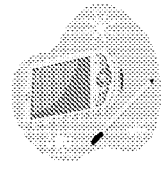
FIGURE 7

METHOD AND SYSTEM FOR USING GLOBAL EQUIVALENCY SETS TO IDENTIFY DATA DURING PEER-TO-PEER SYNCHRONIZATION

BACKGROUND OF THE INVENTION

Synchronization is a function that provides or maintains consistent copies of data between applications, computers, and devices. For example, a desktop computer may have desktop data sets regarding personal information management ("PIM"). A user of that desktop computer may desire to use that PIM data when she is away from her desktop computer. Therefore, she may desire access to the PIM data while using a laptop computer or a personal digital assistant ("PDA") such as a phone or other device like a miniature device. In order to accommodate that desire, her laptop computer and PDA may each carry PIM data sets that correspond to the PIM data sets on the desktop computer. The role of the synchronization function is to give the user a common view of her data on each device. This role is generally accomplished by synchronization events when two or more of the devices synchronize.

A common technique for synchronizing devices is by using snapshots of data at a point in time and comparing current data to the snapshot to determine what has changed. For illustration purposes, FIG. 1 shows models for a desktop computer 100, a portable computer 110, and a PDA 120 for use in synchronization. Desktop computer 100 has PIM database 101, which keeps current information for PIM data sets that are edited or added on the desktop computer 100. Desktop computer 100 also has desktop snapshot database, which is a snapshot of the PIM data sets taken at some point in time but typically the time of a prior (perhaps, the most recent) synchronization. Similarly, portable computer 110 and PDA 120 have portable databases 111 and 121, respectively, for current PIM data.

Typical synchronization occurs by comparing each of desktop database 101, portable database 111, and PDA database 121 with snapshot database 102. Items in respective databases are identified as corresponding if those items share common identity data, which is typically a name in a PIM database, but may be any data property. During the compare operation, corresponding items are compared and the synchronization system assembles a list of data items that are new or changed in the active databases 101, 111, and 121 as compared to database 102. Finally, to finish out the synchronization, the list of new and changed data may be used to update all four databases 101, 102, 111, and 121.

In the described prior art synchronization process between three or more systems, the change of identity data on a record of one of the databases can be problematic. For example, assume a PIM database where the name property is used for identity data. Further, and referring to FIG. 1, assume that a record for Jon Doe (that is, a record including the value "John Doe" in a name property) has been synchronized from the portable 110 to the other systems. The two remaining systems synchronize at a later time, but sometime prior to synchronization the record value is changed on desktop database 101 from "Jon Doe" to "Jonathan Doe." Since the name property is being used as identity data, if the PDA 120 synchronizes with desktop 100, the respective systems will not realize that the record for Jonathan Doe of desktop 100 actually corresponds with the record for Jon Doe of PDA 120. Thus, during synchronization with PDA 120, desktop 100 will believe that the record for Jon Doe from PDA 120 is a new record and will make a copy of the new record in database 101. In addition, PDA 120 will believe that the Jonathon Doe record is a new record and will make a copy of the new record in database 121. The unfortunate result is that both desktop 100 and PDA 120 have two records corresponding to the same person (reflected by only one record in portable 110). The problem is propagated if and when either desktop 100 or PDA 120 synchronizes with portable 110, which upon such synchronization will also obtain the substantively duplicative record and thus maintain two records for Jon(athon) Doe. These newly added records are also not recognized by the remaining peer, causing the records to be continually duplicated between the peers. While we have used a name as an example, the same problem occurs when synchronizing any type of data, e.g., other PIM data such as calendars, or even music or photo records.

Another problem that occurs when three or more synchronizing systems synchronize is known as the deletion problem. Referring again to FIG. 1, assume there is a record for Jane Doe that is exclusively held in desktop 100. When desktop 100 is synchronized with portable 110, then portable 110 will get the Jane Doe record. Similarly, when desktop 100 is synchronized with PDA 120, then PDA 120 will get the Jane Doe record. Further assume now that the user of PDA 120 notices the Jane Doe record and intentionally deletes that record. The problem occurs because, in synchronization of the prior art, a peer cannot identify a previously deleted record. Thus, the PDA 120, upon seeing the corresponding (undeleted) copy of the deleted record on one of the peers, believes the record to be a new record. When PDA 120 and portable 110 synchronize, therefore, that synchronization brings the unwanted Jane Doe record back to PDA 120, ultimately possibly frustrating the user who has deleted it intentionally already. This situation also results in a continual add/delete cycle between the peers, increasing the load on the system.

Yet another similar problem further illustrates issues in the prior art. For example, assume the devices of FIG. 1 are peers in a peer-to-peer system, and each of PDA 120 and portable 110 have synchronized with desktop 100, but PDA 120 and portable 110 have never synchronized with each other. Having each synchronized with desktop 100, PDA 120 and portable 110 are likely to carry a great number of corresponding records. However, their databases may also be significantly incongruous based upon, for example, any of the following circumstances: (i) any changes made to desktop 100 at a time between the synchronizations of PDA 120 and portable 110 will only be represented on the device that synchronized most recently; (ii) any records added or deleted on PDA 120 after its synchronization with desktop 100 will have little create inconsistencies with portable 110; (iii) any records added or deleted on portable 110 after its synchronization with desktop 100 will have little create inconsistencies with PDA 120; and (iii) any modifications (especially to an identity key property) on either PDA 120 or portable 110 will result in obvious inconsistencies as noted above. Yet, as exemplified above, not all these inconsistencies can be remedied through subsequent synchronization because PDA 120 and portable 110 cannot always identify truly corresponding records.

Background art and other techniques related to synchronization may be found in the following U.S. patents and copending patent applications, all of which are incorporated herein by reference: U.S. Pat. No. 5,710,922 "Method for synchronizing and archiving information between computer systems"; "A Method of Synchronising Between Three or More Devices" by Toby Paterson and Jerome Lebel, Ser. No. 10/853,306 filed May 24, 2004, now patent publication no. 2006/0031857; "A Method of Synchronising" by Toby Paterson and Jerome Lebel, Ser. No. 10/852,026 filed May 24, 2004, now patent publication no. 2004/0214926; "State Based Synchronization," by Bertrand Serlet, Ser. No. 10/883,541, filed Jul. 1, 2004, now patent publication no. 2006/0069809; and "Apparatus and Method For Peer-To-Peer N-Way Synchronization In A Decentralized Environment," by Joe Holt, Ser. No. 11/157,647, filed Jun. 21, 2005. In view of the discussion herein as well as the other problems existing in the prior art, certain embodiments of the invention propose a synchronization system that provides for the identification of truly corresponding records and thus resolves the problems discussed above.

SUMMARY OF THE INVENTION

The embodiments described herein relate to the use of a global equivalency identification datum or set of datum (hereinafter "GID") as an aid to synchronization systems and methods. In a very simple embodiment, the synchronization problems discussed above are solved by associating a universally unique identification datum (hereinafter "UUID") with each independently created associated data set (e.g. structured data record). For example, in a specific embodiment relating to PIM data, upon creating a record for Joe Doe in a first peer device, the record is assigned a GID, which for purposes of this example we shall call GID1. If an analogous record for the same Joe Doe is created on a second peer device, that record is also assigned a GID, which for purposes of this example, we shall call GID2. Further, since many embodiments use a UUID as a GID, the GID1 is certainly unique or different from the GID2. If in our example, the name property is the identity key, then upon synchronizing the first peer and the second peer, the two independently created Joe Doe records will be associated as corresponding records of the "same" data set. Finally, according to some embodiments of the invention, as a result of such synchronization, the GIDs of both Joe Doe records will become a Global Equivalency Set ("GES") comprised of GID1 and GID2.

A more complex embodiment may contemplate the software elements in a typical synchronization system and the interaction between those elements. For example, in some embodiments, a synchronization server ("Sync-Sever") software element may be responsible for maintaining synchronization for a plurality of clients; some clients potentially being software elements (e.g. a contact manager program), other clients potentially being devices such as phones or PDAs. Each client represents a vehicle for any one or more of the following: viewing records or portions thereof; editing records or portions thereof, adding records or portions thereof; and deleting records or portions thereof. Furthermore, for the sake of clarity and without limitation, we are generally discussing records as a set of associated properties. For example, a contact record may contain properties or fields such as name, address and phone number. Such a contact may also contain metadata fields such as date of last edit, identity of creator client or the GID datum itself may be carried as a property to a record.

In many embodiments, new records are created by clients, and the creator client assigns a local ID datum to the record. When that creator client synchronizes with the Sync-Server, the new record is pushed to the Sync-Server as a new record. Since the Sync-Server cannot be certain that the record is truly new, the Sync-Server will embark upon a process to verify the newness of the record. It is important to realize that while the creator client believes the new record is indeed new, it may not actually be truly new. This is because, the Sync-Server may already know about a corresponding record that was either (i) independently created by another client (e.g. the same contact information independently entered into two different peers of the relevant group of syncing systems); or (ii) originally a duplicate of the creator clients new record that somewhere in the peer system lost its ability to be readily identified as such (through user and/or system manipulations or anomalies).

In some embodiments, verification of the record's newness involves assuming that the local ID is a GID and comparing that datum to the all GID data sets that the Sync-Server knows about. For example, the Sync-Server may use a table to hold GID information for all of the records known to that Sync-Server, which according to some embodiments may comprise records that have been deleted in the past. If the Sync-Server does not find the GID in its records, then the new record may be treated as truly new (subject to any other checks against the Sync-Server database such as an identity key check). However, if the GID is found in the Sync-Server's records, then the handling of the pseudo new record will be according to the information found on the Sync-Server with respect to that GID. For example, the Sync-Server records may indicate that the record has been previously deleted; and some embodiments may treat the pseudo new record as deleted and inform the creator client to delete it, while other embodiments may enter a conflicts resolution process to determine user intent either expressly or by inference. In some embodiments, when presented with a new record from a client, if the Sync-Server does not find a GID match, the Sync-Server will proceed to check the new record's identity keys against the Sync-Server's relevant database or table. If there is no GID match but there is an identity key match, some embodiments will associate the two records and update the GES for that record in each system (the client and the Sync-Server) to reflect two GID datums (one for the original record on the Sync-Server and one for the new record coming from the client). These actions may also be taken if the identity keys have substantially the same value. In various embodiments, substantially the same value may be defined as having a particular number or pattern of common values. For example, if a name property is the identity key, values may be defined as substantially the same value if the last name of each value is identical and the first name of one value is a common nickname or an alternative spelling of the first name of another name property value. Other variations of this concept will be apparent to those of skill in the art. Equivalent values may be pre-configured and stored, may be dynamically determined according to an algorithm, or a combination of the two. In addition to updating the GID properties of each system, any conflict between the properties of the associated records will be resolved. Of course, each system may have a different scheme for property-level conflict resolution, and many such schemes are known in the art and may be included in the patents and patent applications incorporated herein.

BRIEF DESCRIPTION OF THE DRAWINGS

FIG. 5 is an exemplary software stack.

FIG. 7 shows the synchronization of three systems.

DETAILED DESCRIPTION

I. Vocabulary and Non-Limitation

Figure 1:
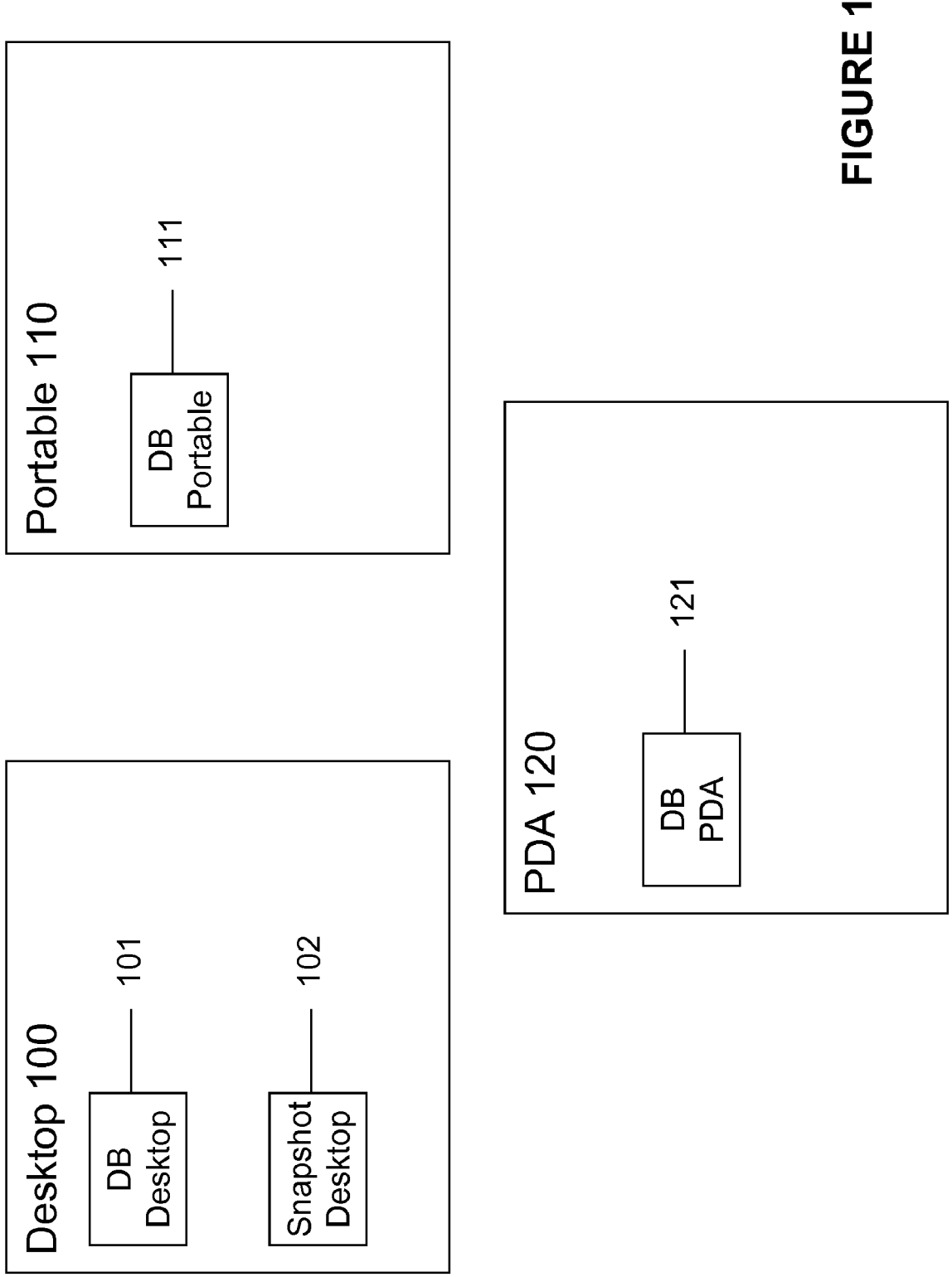
FIG. 1 shows devices that may synchronize.

Throughout this disclosure, we shall use certain vocabulary to discuss synchronization techniques and examples. Most of the illustrations discussed will relate to PIM data and the synchronization of same. However, many embodiments of the invention are expressly intended to apply to virtually any kind of data. Some examples of data that may be synchronized using the techniques taught herein are the following: text files; word processing files; files from a file system, media files such as jpegs, mp3, mpeg2, mpeg4, or wav files; records from a database; favorites lists; preferences settings, or any other data file type or data that may comprise a file or object, whether or not associated with a specific applications. Therefore, in discussing synchronization services, we are at least referring to services that would apply to application software suite sold by Apple Computer. Some examples of that software include, without limitation, Dashboard, Safari, iChat AV, Mail, iCal, iPhoto, iWeb, iMovie HD, iDVD, Garageband, Keynote, and Pages.

Retreating then to the language of most of our illustrative embodiments, we shall primarily discuss the invention in terms of PIM data. Generally, we shall discuss devices such as computers, PDAs, phones or other intelligent devices that are used to access PIM data. Each device is generally associated with a Sync-Server and a sync client, which are each usually one or more processes resident on the device. In some instances, a first device will have a sync client resident on another device (this is called a proxy). This may be because the first device is not sufficiently equipped to host a sync client. Alternatively, in a multi-peer system, the synchronization system may use a local proxy for each other peer in order to synchronize all peers even when many peers are not present (the proxy stands in for the missing devices). These proxies are also simply known as sync clients to the Sync Server.

PIM data itself generally occurs as personal contacts, calendar entries, notes, journal entries, etc. When we discuss a record, we are generally referring to a set of data items that have been associated. For example, a personal contact card for John Doe may be viewed as a record wherein a phone number, street address, pager number and a variety of other data items are interrelated by their common association with John Doe. Each record present for a Sync Server or client may have a corresponding record on other Sync Servers or clients. For example, there may be a contact record for Jon Doe on each of Jane Doe's phone, desktop computer and portable computer. Likewise, each item of PIM data on a single device may have one or more corresponding data items on one or more other devices. For example, Jon Doe's street address may have corresponding data items on each of Jane Doe's desktop computer, portable computer, PDA, and telephone. Likewise, if our data were digital photographs, a picture of Jon Doe on the desktop may have corresponding pictures of Jon on the PDA, the portable computer and elsewhere. It is an overall job of the synchronization function to provide a common view (as much as possible) of corresponding data across many devices. In many embodiments, the common view comprises analogous or corresponding records as well as analogous or corresponding properties within those records.

II. Sample Hardware and Software Structures

Figure 2:
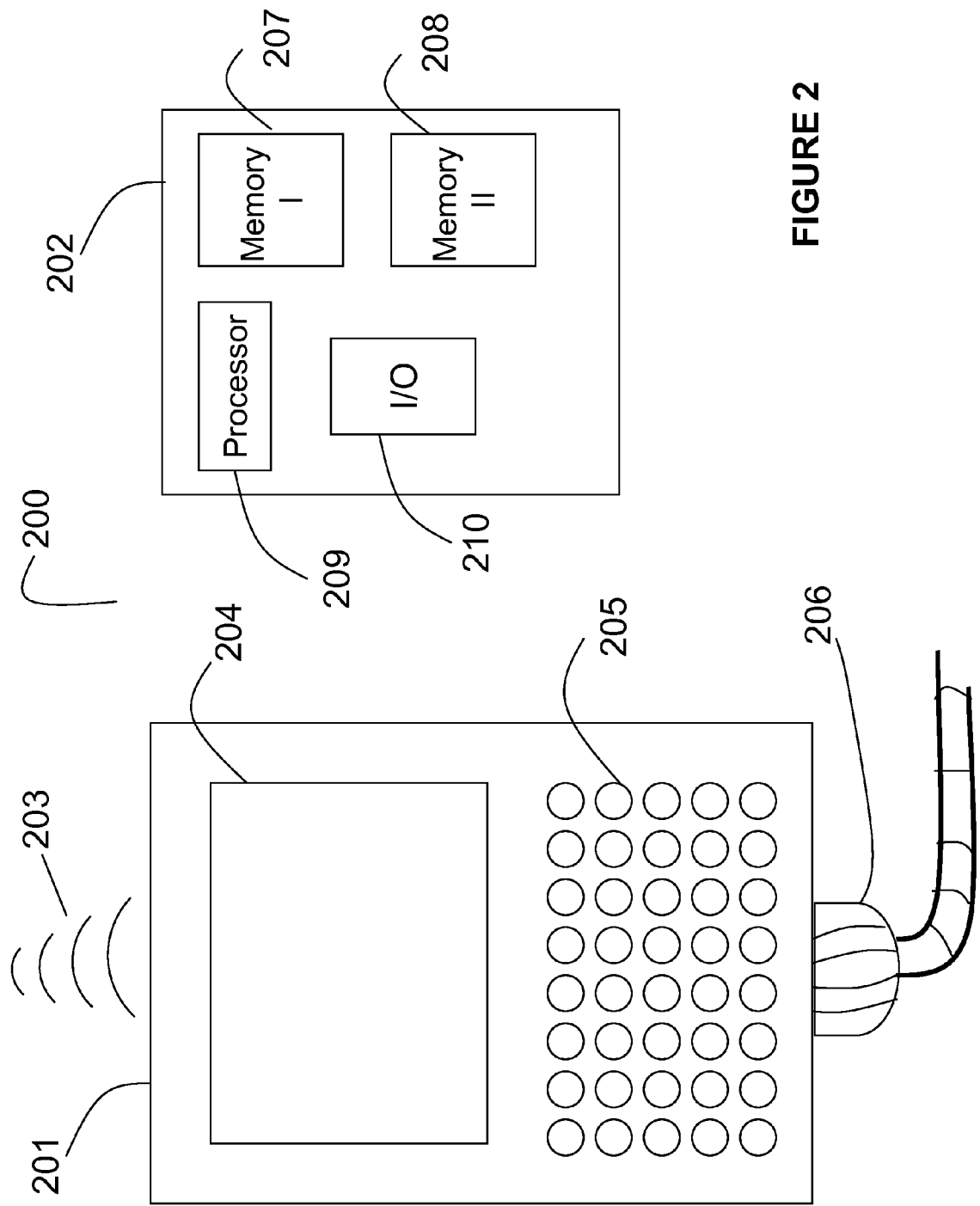
FIG. 2 is exemplary hardware.

While the techniques described herein may be embodied in virtually any structural context, we shall describe some example structural embodiments for illustrative purposes. Referring to FIG. 2, there is shown a sample portable device such as a PDA or telephone handset. As stated earlier, a client device or Sync-Server may be embodied in any item with sufficient intelligence to allow users to access or edit data, either directly or indirectly. Therefore, the device of FIG. 2 is intended to illustrate, without limitation, a sample of any such device. Front view 201 of device 200 shows screen 204 that may be used for viewing or accessing data as well as inputting data (in the case of a touch-sensitive or otherwise input-equipped screen). Keypad 205 may also be used for data input such as by alpha-numerics or otherwise and wired connection 206 may be used for power and/or data transport. Wireless port 203 may be infrared, Bluetooth, 802.11, EV-DO or any other wireless transmission for moving data in and out of device 200. Turning now to inside 202 of device 200, we see that a processor 209 is present for performing processing tasks. The inventive embodiments may incorporate any type of device so processor 209 may be any type of microprocessor or controller or aggregate of components that perform the function of running software for effecting one or more of the device functions, such as, for example, one of the Intel Pentium family or IBM/Motorola PowerPC chips. Device 200 may also have two or more types of memory for storing data and programs as shown by memories 207 and 208. Memories 207 and 208 may be implemented as both volatile and non-volatile computer memory and may be any type such as magnetic memory, optical memory or any of the many types of silicon-based memory such as SRAM and DRAM. Finally, device 200 may have components 210 to support I/O functionality such as that potentially embodied in wired connection 206 and wireless connection 203.

Figure 3:
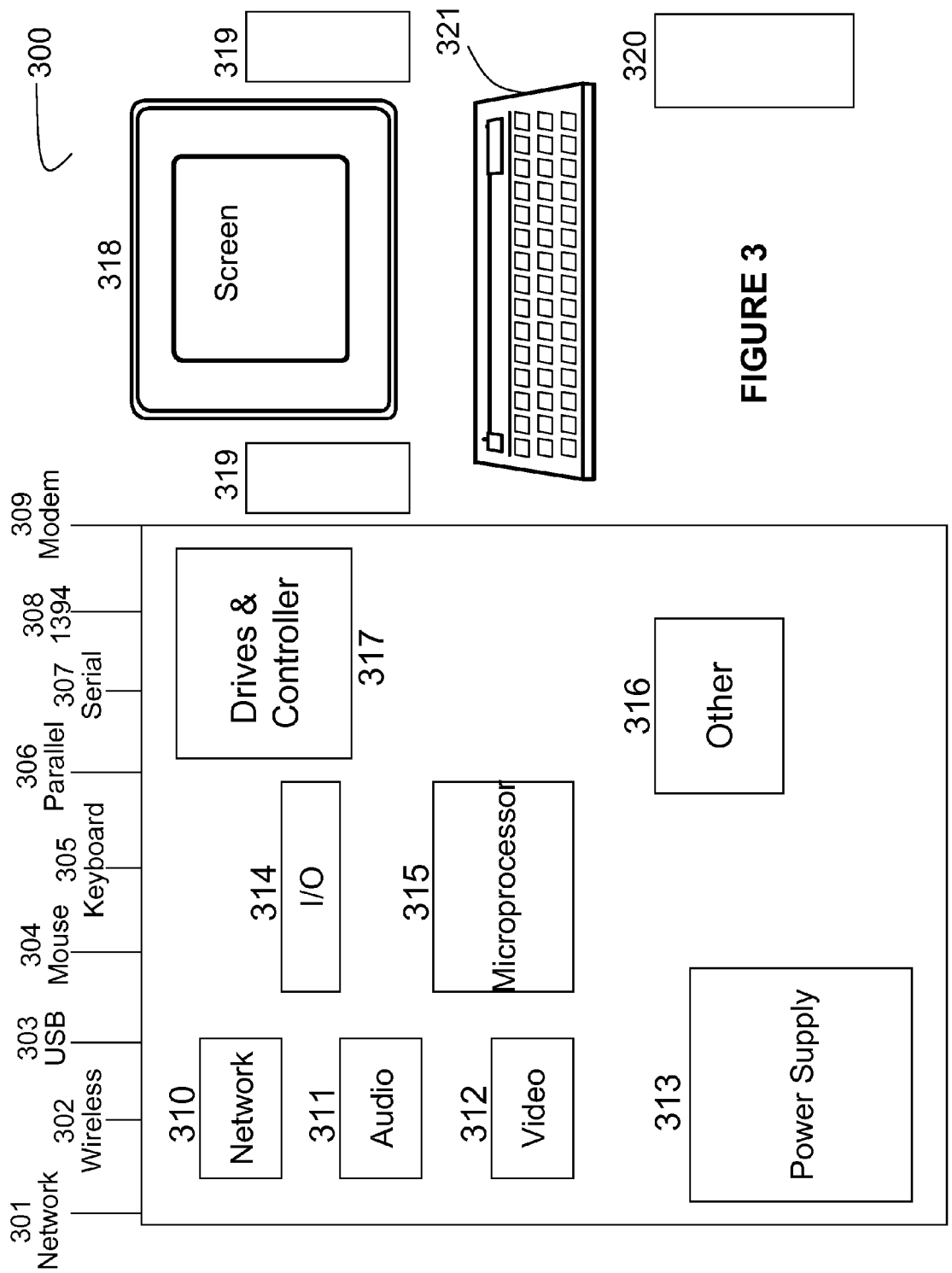
FIG. 3 is exemplary hardware.

Referring now to FIG. 3, computer 300 is another illustration of a device that may embody a client or Sync-Server or that otherwise exploits concepts of the invention. Computer 300 is an ordinary computer, such as a personal computer, but not intended to be limited as such. Computer 300 has one or more microprocessors 315 and an accompanying chipset (not shown) at the heart of the system. The chipset may include items such as network unit 310, audio unit 311 and many I/O functions such as those that might be embodied in I/O unit 314. Of course, any of these functions, or sub-functions, may be implemented individually or collectively within a chipset or outside. Computer 300 also has power supply 313 for adapting and supplying power. Computer 300 may have any variety of optical and magnetic drives and the appropriate controllers to use those drives 317 such as IDE, ATA, SATA or SCSI controllers. For user accessibility, computer 300 has monitor 318, speakers 319, keyboard 321 and a mouse or tablet/touch screen 320. Finally, computer 300 may connect with any manner of other items (such as other devices carrying corresponding data items) through various ports (Network 301, wireless 302, USB 303, mouse 304, keyboard 305, parallel 306, serial 307, devices compliant with the IEEE 1394 standard 308, or modem 309).

Transitioning from sample hardware, we shall now discuss general software background. In particular, referring to FIG. 4, there is shown a software stack intended to be illustrative of the software architecture in which software aspects of some embodiments of the invention will reside. Aspects of the present invention are implemented as a collection of software modules installed and running on a computer. Thus the software modules are computer program instructions for processing by a processor. These computer program instructions are stored in computer memory. The interrelation of these software modules is shown by the software stack of FIG. 4. Like our hardware examples, this structure is not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in any particular layer use resources from the layers below and provide services to layers above. However, in practice, all components of a particular software element may not behave entirely in that manner.

Figure 4:
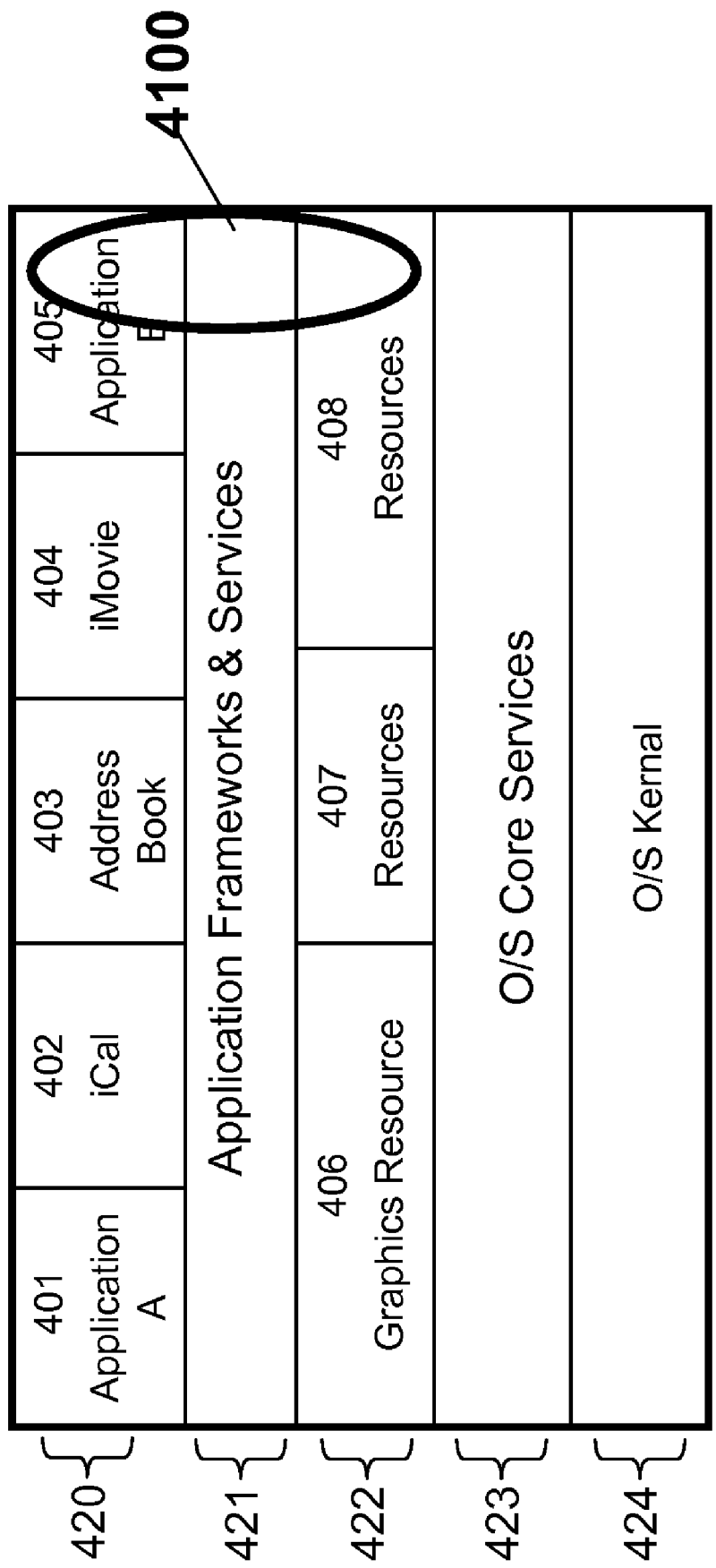
FIG. 4 is an exemplary software stack.

With those caveats, we see in FIG. 4 two layers 424 and 423 dedicated to the operating system kernel and core services, respectively. Generally, above core services layer 423 there are software layers (422 and 421) for providing higher level resources and services to applications in the application layer 420. Putting the layer diagram in context, we would generally expect to find PIM type software in the application layer 420. For example, there are iCal application 402 and Address Book application 403 residing in the application layer. iCal 402 and Address Book 403 are application programs that manage PIM data and present a user interface that allows a user to access, edit or manipulate that data. These application layer services are a type of sync client in that a synchronization function provides services to these clients by maintaining a common view (as much as possible) of data among designated clients. Area 4100 shows generally where processes implementing the synchronization function may be located in many embodiments. In more particularity, a process implementing the synchronization function may be a peer to its application clients or may reside in a layer below, possibly even masking itself to the application (referring to a sync client that does not know that it is a sync client). The sync function may also have components in two or more layers. In many embodiments, however, the application level sync clients provide a user interface to configure and exploit the synchronization functions, therefore the synchronization processes appear as an integrated feature in client software. In addition, the synchronization processes typically may present their own user interface for configuration and control that is independent of any particular application. Lastly, as discussed earlier, sync clients may exist as a proxy for an external device. Such a proxy process has less need for a user interface and generally (but not necessarily) exists in the higher layers of the software stack.

Referring again to FIG. 4, one aspect of some embodiments provides a Sync-Server and associated software for servicing the synchronization needs of user-level application software (e.g. layer 420). As a services function, this aspect resides in layers 421 and/or 422.

III. An Example of a Four Peer System a. A Sample Software Stack and Group of Synching Peers Referring to FIG. 5, a sample four-device system is shown along with a sample software stack 530. In particular, the group of theoretically syncing devices comprises desktop computer peer W 514, notebook computer peer X 515, PDA peer Y 516 and cell phone quasi-peer Z 517. The intent is not to limit the applicability of the invention to devices such as these, but rather to give common examples of devices that may be involved in a synchronizing group. Furthermore, the moniker "quasi-peer" will be explained later, but should not imply that a phone or any other device cannot be a full peer.

Referring further to FIG. 5, exemplary software stack 530 is shown and represents a potential software stack on any peer device. Sync-Server W 506 is so named to imply that this example software stack is a potential software stack for peer W 514 in particular. Above the O/S kernel 424 and core services 423 on the software stack is a sync services framework 523 layer used to implement the standard structure drawn upon by the services layer above. Furthermore, as compared to FIG. 4, one can see that this is a simplified software stack that only illustrates synchronization-related processes or programs in the services layer 522 of FIG. 5. Referring then to FIG. 5 and assuming that software stack 530 resides or runs in peer W 514, we see that Sync-Server W 506 is accompanied by a program or process for each peer or client device in the synchronizing group. Thus we see that: peer Y 516 is represented by client Y 508; peer X 515 is represented by client X 507; Application A 501 is represented by client app A 510; iCal 502 is represented by client iCal 511; Address Book 503 is represented by client Addr. Book 512; iMovie 504 is represented by client iMovie 507; application B 505 is represented by client app. B 513; and finally quasi-peer Z 517 is represented by client Z 509. This arrangement, present in some embodiments, is generalized as a preference for a Sync-Server to be accompanied by a client process or program corresponding with each peer or client device. Obviously, any particular Sync-Server may not be accompanied by client processes for client devices that the Sync-Server does not know about. Therefore, certain embodiments of the invention contemplate the creation of client processes as necessary when adding a new client device to the synchronization group; or when a particular peer first realizes the existence of another peer.

The Sync-Server and client processes work together to service the synchronization needs of the client device. In some embodiments, the work can be modeled by assuming that the client process represents the client device to the Sync Server. Thus, in many embodiments, the client process is responsible for interaction with the client device and serves as intermediary for the device with the Sync Server. Alternatively, the Sync-Server is responsible for maintaining the accuracy of synchronization through its own techniques and the protocols it requires of the clients.

As noted earlier, the moniker "quasi-peer" was given to the exemplary cell phone quasi-peer 517 to indicate a potential difference between it and full peers. That indication is to exemplify a device type that is desirable to include in the synchronization group but that may be incompatible or incapable of running a compatible Sync-Server and client processes. In the case of such a client device, the associated software process, client Z 509, usually serves as a proxy to quasi-peer Z 517 and has more significant duties and data retention (as well known in the art) than a normal client process. Thus, for example, client Z 509 may retain data structures that represent all the relevant data for synchronizing on quasi-peer Z 517. Furthermore, client Z 509 may also be responsible for monitoring and enforcing hardware and software limitations of the device such as the number of records that fit or number and types of properties or fields allowed for a record. Obviously neither the function of client Z 509, or any other process discussed, is necessarily limited to a single program or process.

b. A Sample Synchronization

Figure 6:
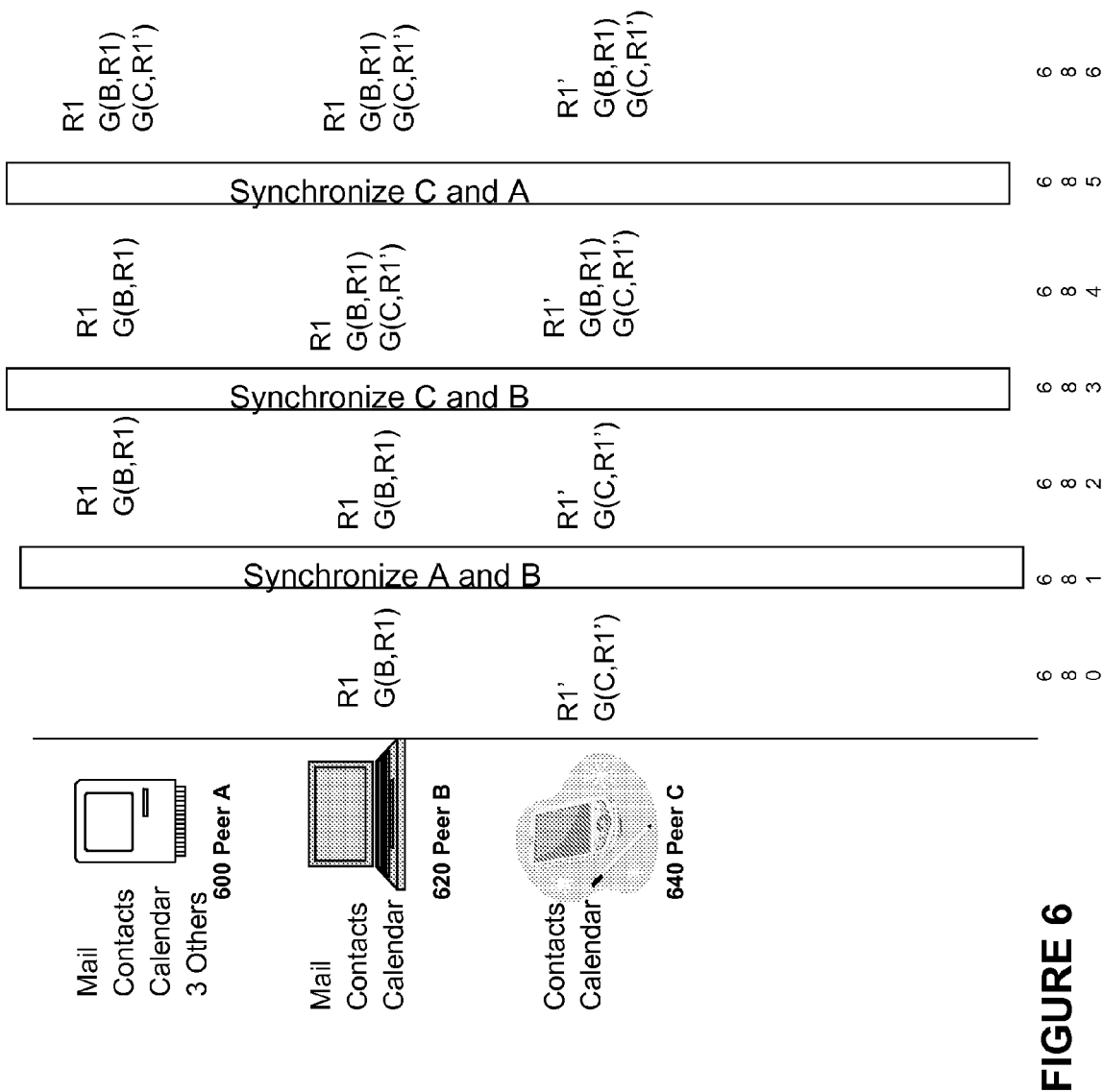
FIG. 6 shows the synchronization of three systems.

Referring now to FIG. 6, there is shown a diagram comprising three synchronizing systems in table form displaying various systems (A 600, B 620, and C 640) in a column. From left to right of FIG. 6, subsequent columns 680, 681, 682, 683, 684, 685 and 686 show state or operations of and between the systems. Thus, if one looks across the row of system A 600, columns 680, 681, 682, 683, 684, 685 and 686 of that row show (in alternating fashion) either the state of system A 600 or an operation taking place in the system. In addition, for illustrative purposes, each system is accompanied by a list of internal synchronization clients, e.g. Mail, Contacts, and Calendar. This example will only refer to a generic record R1 that represents a record of any single structured data type.

Referring further to FIG. 6, we see the initially illustrated state in column 680 showing that system B 620 has record R1 and system C 640 has record R1'. For illustration of inventive embodiments, one assumes that R1 and R1' were independently created on system B 620 and system C 640, respectively. In fact, if one assumes that R1 and R1' are structured data of the contact type, we assume that local contact software applications on system B 620 and system C 640 were responsible for creation of R1 and R1' respectively; and further, that such local application programs assign local IDs to those records. As an added feature, in some embodiments, the Sync-Server in respective systems will assume that local ID is a UUID and thus use the local ID as a GID datum. Therefore, in such embodiments the client processes and/or client devices (including application programs etc.) should be required to supply UUIDs as local IDs. UUID as defined here may be any globally unique identifier, including, but not limited to a UUID as defined in Internet Engineering Task Force RFC 4122. If the Sync-Server cannot be confident that the local ID will be a UUID, then there is risk in using the local ID as the GID datum. This is because, there may be another unrelated record in the system using the same GID and significant data corruption might ensue.

With respect to the creation of R1 and R1', there are other interesting points to note. First, many embodiments require that a universally unique ID (UUID) is assigned to record upon the creation of the record. In the broadest sense, this is actually the Sync-Server's responsibility; however, in common embodiments where the client local ID is ultimately used by the Sync-Server as the GID datum, the responsibility falls further down to the client application where the record was created. Moreover, in the case of a quasi-peer type device as discussed earlier, the responsibility likely falls upon the proxy portion of the client process. Second, one should note that creation of a record can take many forms such as input by a user typing, by importing through software, or otherwise coming to the client device through a mechanism other than synchronization with members of the synchronization group here-discussed. Third, one should note that in some embodiments, GID datum is simply a property of a record. If the record somehow exists without a GID property field, then that field is created when it becomes desirable to incorporate GID datum in the record's properties. Fourth, one should also note that records may carry GID datum in one or more property fields. As we should discuss, the GID properties of a record may comprise multiple sets of GID datum. All of the GID datum can be combined in a single property field or each can have its own property field.

Having discussed origin and nature of a GID datum, one should also note that in FIG. 6, there is GID datum represented directly under R1 and R1' in column 680, respective rows for system B 620 and system C 640. For example, R1 has the property of GID datum G(B,R1). The nomenclature chosen here is as follows: "G" to represent global rather than local ID; "B" to represent the client device where the record "R1" was created. Moreover, with respect to R1' we see GID property G(C, R1') because "G" represents global ID; "C" represents the client device where the record "R1'" was created.

Having set that predicate, we can move to column 681 and see that our example calls for the synchronizing system A 600 with system B 620. With attention to column 680, we see that system A 600 started with a null for data, therefore column 682 shows that after synchronizing with system B 620, system A 600 has record R1, the GID property of G(B,R1), which simply comes as a property of R1. Moving then to column 683, we see our example calls for synchronizing system C 640 with system B 620. Assuming these systems have never synchronized before, they will attempt to match their records by identity key data properties. In that process they will identify that R1 and R1' are the same record (or at least similar enough to be associated). Therefore, the records will be synchronized without creating a duplicate record and by using the domain's conflict rules for resolving any property conflicts; however, excepting the GID property, which, if residing in the same field property, is resolved by deriving a global equivalency set from the GID datum of both records. This derivation is discussed throughout in terms of combining (by accumulating, concatenating, or any other functional means) the GID datum. However, any derivation resulting in a derived global equivalency set with a value unique to the GID datum (or, in some embodiments, previous global equivalency sets) from which the global equivalency set is derived (e.g., a hash function) may also be used, are readily apparent to those of skill in the art. If GID data reside in individual record property fields, then there will be no conflict and new property field is created when a unique GID datum is added to a record. Therefore, we see in column 684 (post synchronization) that system B 620 still has R1, but that the GID properties have been updated by the synchronization so that those properties represents the GID datum set G(B,R1), G(C,R1'). Similarly, with attention to column 684, we see that post synchronization, system C 640 still has R1' but its GID properties have been updated by the synchronization so that those properties now represent G(B,R1), G(C,R1'). Finally, having had no interaction in the synchronization, the data state of system A 600 remains unchanged.

Moving then to FIG. 6, column 685, we see the example calls for the synchronization of system A 600 with system C 640. In order to illustrate the inventive concepts, we assume for this synchronization that R1 of system A 600 will not be matched to R1' of system C 640 by virtue of an identity key match. The assumption illustrative of the real world where identity keys may be altered or where identity key matches may not be attempted based upon whether the systems have ever synchronized before. Without the benefit of an identity key match, the system can only determine that the records are the same by use of the GID property information. Thus each system receiving an apparently new record will check if any of the datum from the new record's GID property match any of the GID datum of the records that the receiving system knows about. Obviously, one way to perform this check is through brute force of checking every relevant record known to the Sync-Server. In the example being discussed, such brute force analysis is rather trivial because there is only one record in each system. As such, with attention to column 686, we see that the GID property information helps yield the correct result and now all three of the devices in FIG. 6 now hold records having the same GES, which is G(B,R1), G(C, R1'). Further, since the GID datum are simply kept as a record property, they may be maintained by the resident synchronization function.

Given the potential avoidance of duplicates and false adds (adding a record previously deleted), some Sync Server embodiments check GID information before checking identity key properties. Some embodiments also perform identity key property or other property analysis to determine if records are the same. Techniques for this analysis are known in the art.

c. GID Datum Tables

One potential disadvantage to the foregoing example is the use of brute force to match or search or GID datum equivalency. Thus, in many embodiments of the invention a Sync-Server maintains tables for use in GID equivalency searching. For any given type of structured data, each table may associate (e.g. in the same row) the following items: a native GID datum; all associated non-native GID datum; and a key into the local associated record. By way of explanation, the Native GID datum may be represented by the first GID that a particular Sync-Server receives for a record. Therefore, if the record is created on an application program local to the Sync-Server, the native GID datum is the GID datum assumed at the creation of the record. Alternatively, if a GID datum is first received with a new record from another system, that first received GID may be used for the native GID. As yet another alternative, for GIDs created on other systems, a Sync-Server may create a native GID, for example, represented by the GID format discussed above (i.e. G(local system identifier, record identifier)). For purpose of illustration, we shall retread the example of FIG. 6, while periodically showing the state of all three GID tables (one for each sync server or system).

Therefore, referring to FIG. 6, column 680 showing the data state of the three systems A 600, B 620 and C640. The corresponding table state is as follows:

| Table for System A 600 | | |
|---|---|---|
| Native GID Datum | Non-Native Associated GID Datum | Key into local record |
|  |  |  |

| Table for System B 620 | | |
|---|---|---|
| Native GID Datum | Non-Native Associated GID Datum | Key into local record |
| G(B, R1) |  | R1 |

| Table for System C 640 | | |
|---|---|---|
| Native GID Datum | Non-Native Associated GID Datum | Key into local record |
| G(C, R1') |  | R1' |

Thus, we see that at the state represented by FIG. 6, column 680, Sync-Server A's table is null because system A 600 has no data. Furthermore, Sync-Server B's table has a native ID representing system B 620's creation of the record R1 (which uses its record name to serve as a local key), and there is no non-native associate GID datum.

Moving now to column 681, that is a function calling for the synchronization of system A 600 and system B 620. The result in column 682 shows that after synchronizing with system B 620, system A 600 has record R1, and the GID property G(B,R1). The new tables corresponding with the data state at column 682 are as follows:

| Table for System A 600 | | |
|---|---|---|
| Native GID Datum | Non-Native Associated GID Datum | Key into local record |
| G(B, R1) |  | R1 |

| Table for System B 620 | | |
|---|---|---|
| Native GID Datum | Non-Native Associated GID Datum | Key into local record |
| G(B, R1) |  | R1 |

| Table for System C 640 | | |
|---|---|---|
| Native GID Datum | Non-Native Associated GID Datum | Key into local record |
| G(C, R1') |  | R1' |

Thus, we see that the only change to the tables occurring due to synchronization of system A 600 with system B 620 is that system A 600 received a duplicate of the record and properties (including GID datum) in system B 620. It is noteworthy that we have chosen to use G(B,R1) as the native GID datum for system A 600. As discussed earlier there are many other alternatives that fall within the scope of the invention.

Moving then to FIG. 6, column 683, we see our example calls for synchronizing system C 640 with system B 620. Assuming these systems have never synchronized before, they will attempt to match their records by identity key data properties. In that process they will identify that R1 and R1' are the same record. Therefore, the records will be synchronized without creating a duplicate record. The result is shown in column 684 and indicates that system B 620 still has R1, but that the GID properties have been updated by the synchronization so that those properties represent the GID datum set G(B,R1), G(C,R1'). Similarly, with attention to column 684, we see that post synchronization, system C 640 still has R1' but its GID properties have been updated by the synchronization so that those properties also represent G(B,R1), G(C, R1'). Finally, having had no interaction in the synchronization, the data state of system A 600 remains unchanged. The state of respective tables corresponding with column 684 is as follows:

| Table for System A 600 | | |
|---|---|---|
| Native GID Datum | Non-Native Associated GID Datum | Key into local record |
| G(B, R1) | | R1 |

| Table for System B 620 | | |
|---|---|---|
| Native GID Datum | Non-Native Associated GID Datum | Key into local record |
| G(B, R1) | G(C, R1') | R1 |

| Table for System C 640 | | |
|---|---|---|
| Native GID Datum | Non-Native Associated GID Datum | Key into local record |
| G(C, R1') | G(B, R1) | R1' |

Thus we see that the tables for Sync-Servers B and C have been updated to show non-native associated GID datum. Since our example has only three systems and two independent creations of the same record, this example will not carry more than one non-native associated GID datum per native GID datum. However, one should note that in a more complex and/or larger system consistent with real-world use and manipulation, there may be many non-native associated GID datum per native datum. From the standpoint of the inventive concepts, there is no limit.

Moving then to FIG. 6, column 685, we see the example calls for the synchronization of system A 600 with system C 640. Without the benefit of identity key matching, the system can only determine that the records are the same by use of the GID property information. Thus each system receiving an apparently new record will check if any of the datum from the new record's GID property match any of the GID datum of the records that the receiving system knows about. Here, the tables become very convenient because they simplify this checking process. Nevertheless, with attention to column 686, we see that the GID property information helps yield the correct result and now all three of the devices in FIG. 6 now hold records having the same GID properties, which is G(B, R1), G(C,R1').

| Table for System A 600 | | |
|---|---|---|
| Native GID Datum | Non-Native Associated GID Datum | Key into local record |
| G(B, R1) | G(C, R1') | R1 |

| Table for System B 620 | | |
|---|---|---|
| Native GID Datum | Non-Native Associated GID Datum | Key into local record |
| G(B, R1) | G(C, R1') | R1 |

| Table for System C 640 | | |
|---|---|---|
| Native GID Datum | Non-Native Associated GID Datum | Key into local record |
| G(C, R1') | G(B, R1) | R1' |

Thus, we see now that all three systems have a full understanding of the same status in the system.

IV. The Case of Deletions

Some embodiments of the invention benefit from the GID techniques by acquiring the added ability to determine if a "new" record being pushed to a Sync-Server is actually a record that has been previously deleted. With that added knowledge, the Sync-Server can maintain a view of data that is most consistent with the user's desires. Thus, many embodiments of the invention contemplate techniques for use when deleting records.

In some embodiments, when the Sync-Server is notified of a deletion, it deletes the record and all its properties, including all its GID properties. However, the Sync-Server does retain a "tombstone" of the deleted record. The tombstone is datum that indicates the identity of the record and its disposition as deleted. In some embodiments, the tombstone datum is retained in log-type information for tracking the various client synchronizations. So, in those embodiments, the synchronization generation information will also be associated with the tombstone. In addition, upon deletion of a record, most embodiments do not immediately call for the deletion of the native-to-non-native association datum in the table discussed above. The association datum in the tables may only be deleted once the Sync-Server is certain that all know systems have deleted the record. The tombstones may be deleted at that time as well.

For purpose of illustration, we will discuss an example regarding deletions. Referring to FIG. 7, column 780 we assume an initial data state as shown for system A 700, system B 720 and system C 740. Furthermore, the native to non-native association tables at the point of column 780 will look like the following:

| Table for System A 700 | | |
|---|---|---|
| Native GID Datum | Non-Native Associated GID Datum | Key into local record |
| G(A, R1) | G(B, R1') | R1 |

Table for System B 720

| Native GID Datum | Non-Native Associated GID Datum | Key into local record |
|---|---|---|
| G(B, R1') | G(A, R1) | R1 |

Table for System C 740

| Native GID Datum | Non-Native Associated GID Datum | Key into local record |
|---|---|---|

Moving to column 781, we see that our example requires system B 720 to delete R1'. As discussed earlier, when system B 720 deletes R1', the Sync-Sever in system B will: (i) delete all properties of the record; maintain a tombstone as described above; and leave the related entries in the native-to-non-native GID association table. The data state of the systems is then shown in column 782 and the state of the native-to-non-native association tables will be unchanged as follows:

Table for System A 700

| Native GID Datum | Non-Native Associated GID Datum | Key into local record |
|---|---|---|
| G(A, R1) | G(B, R1') | R1 |

Table for System B 720

| Native GID Datum | Non-Native Associated GID Datum | Key into local record |
|---|---|---|
| G(B, R1') | G(A, R1) | R1 |

Table for System C 740

| Native GID Datum | Non-Native Associated GID Datum | Key into local record |
|---|---|---|

Moving on to column 783, the example requires that we synchronize system A 700 with system C 740. Since system A 700 has no knowledge regarding the system B deletion of the record, result column 784 shows that system A 700 pushes record R1 to system C and, of course, includes the GID properties. Therefore, we have a situation here where system C has updated its datum to incorporate a record that the user probably intended for deletion. However, using the embodiments of the invention, we shall see that the user's intent shall ultimately prevail. In any case, the state of the native-to-non-native association tables at the point of column 784 will be as follows (although for the first time in our examples, we are assuming that the Sync-Server in system B will create its own native ID for the table):

Table for System A 700

| Native GID Datum | Non-Native Associated GID Datum | Key into local record |
|---|---|---|
| G(A, R1) | G(B, R1') | R1 |

Table for System B 720

| Native GID Datum | Non-Native Associated GID Datum | Key into local record |
|---|---|---|
| G(B, R1') | G(A, R1) | R1 |

Table for System C 740

| Native GID Datum | Non-Native Associated GID Datum | Key into local record |
|---|---|---|
| G(A, R1) | G(B, R1') | R1 |

Moving now to column 785, we see that our example requires the synchronization of system B 720 with system C 740. According to our example, system B 720 and system C 740 have never seen each other before, however, due to the GID properties, the result of the synchronization will turn out in accordance with the user's desires. In particular, system C 740 will attempt to push R1 to system B, but because the GID properties of record R1 match the table entry of system B 720's native-to-non-native association table, system B is able to determine that record R1 has a corresponding datum on system B. Thus, system B can use the R1 tombstone to determine that R1 was deleted and then system B 720 can push the deletion back to system C 740. Thus, we see in result column 786 that, using the inventive embodiments, rather than system B receiving an unwanted record, an unwanted record was removed from system C. Once again the table status remains unchanged as follows:

Table for System A 700

| Native GID Datum | Non-Native Associated GID Datum | Key into local record |
|---|---|---|
| G(A, R1) | G(B, R1') | R1 |

Table for System B 720

| Native GID Datum | Non-Native Associated GID Datum | Key into local record |
|---|---|---|
| G(B, R1') | G(A, R1) | R1 |

| Table for System C 740 | | |
|---|---|---|
| Native GID Datum | Non-Native Associated GID Datum | Key into local record |
| G(A, R1) | G(B, R1') | R1 |

Finally, per column 787, we can synchronize system A 700 with either of system B 720 or C 740 and get the same result, which is shown column 787. Again, rather than revive a deleted record, the delete is pushed to the system holding the obsolete record. It may be determined that all clients have synchronized the last modification of a record by analyzing the last synchronization generation associated with the client or the last modified generation associated with each record. This function may be used to determine that all regularly synching clients have knowledge of a deleted record.

The foregoing embodiments are intended as illustrative and without limitation unless expressly stated. One skilled in the art may adapt these embodiments and illustrations in a variety of ways. Such adaptation is expected and intended as part of the discussion herein.

What is claimed is:

1. A system operable synchronization method comprising:
   receiving at a first system one or more second data sets from one or more clients, the first system having one or more first data sets, the one or more first data sets each having associated therewith a first global equivalency identification (GID) and each having one or more first identity keys related to first data of the first data set, the one or more second data sets received from the one or more clients each having associated therewith a second GID and each having one or more second identity keys related to second data of the first data set, each of the first and second GIDs uniquely identifying its associated data set from among other data sets created on other systems;
   identifying whether any of the one or more second data sets is a new data set for the first system by determining if any of the second GIDs associated with the one or more second data sets is not equivalent to one of the first GIDs associated with the one or more first data sets at the first system;
   upon identifying any of the second data sets as being a new data set for the first system, identifying whether any of the new data sets is an independently created data set at least similar to one of the first data sets at the first system by checking if at least one of the second identity keys of the new data set is at least similar to at least one of the first identity keys of at least one of the first data sets at the first system; and
   upon identifying any of the second data sets as being an independently created data set, associating the first data set and the independently created data set having at least similar first and second identity keys as corresponding to each other at the first system.

2. The method of claim 1 wherein associating the first data set and the independently created data set as corresponding to each other further comprises deriving a global equivalency set from the first GID and the second GID associated therewith.

3. The method of claim 2, wherein the global equivalency set comprises a combination of the first and second GIDs.

4. The method of claim 1 further comprising storing in memory at the first system one or more global equivalency sets each derived from one or more corresponding GIDs, wherein identifying whether any of the second data sets is a new data set for the first system comprises determining that any of the second data sets is not new by identifying that one of the global equivalency sets stored in memory is derivative of the second GID of the second data set.

5. The method of claim 1 wherein each of the GIDs comprises a first identifier that uniquely corresponds to the system on which the GID has been generated.

6. The method of claim 5 wherein the first identifier of the GID comprises a Universally Unique Identifier.

7. The method of claim 5, wherein for the GID, the system on which the associated data set has been generated includes the system on which the associated data set was first created or last modified.

8. The method of claim 5, wherein each of the GIDs comprises a second identifier that identifies the associated data set on the system on which the data set has been generated.

9. The method of claim 8, wherein the second identifier comprises a record identifier identifying a record having data corresponding to the data set.

10. The method of claim 1 further comprising, upon identifying any of the second data sets as being a new and not independently created data set, storing the second data set in memory at the first system.

11. The method of claim 1, wherein each of the identity keys comprises a data element or property of the associated data set.

12. A program storage device, readable by a programmable control device, comprising instructions stored on the program storage device for causing the programmable control device to perform a method according to claim 1.

13. A first system for synchronizing with one or more second systems, the first system comprising:
    a processor; and
    a memory operatively coupled to the processor, the memory having stored therein:
       one or more first data sets each having associated therewith a first global equivalency identification datum (GID) and each having one or more first identity keys related to first data of the first data set, and
       a synchronization server program adapted to:
          receive from one or more clients one or more second data sets, the one or more second data sets each having associated therewith a second GID and each having one or more second identity key related to second data of the second data set, each of the first and second GIDs uniquely identifying its associated data set from among other data sets created on other systems;
          identify whether any of the second data sets is a new data set for the first system by determining if any of the second GIDs associated with the one or more second data sets is not equivalent to one of the first GIDs of the first data sets at the first system;
          upon identifying any of the second data sets as being a new data set for the first system, identify whether any of the new data sets is an independently created data set at least similar to one of the first data sets at the first system by checking if at least one of the second identity keys of the new data set is at least similar to at least one of the first identity keys of at least one of the first data sets at the first system; and
          upon identifying any of the second data sets as being an independently created data set, associate the first data set and the independently created data set having at least similar first and second identity keys as corresponding to each other at the first system.

14. The system of claim 13 wherein the synchronization server program is adapted to identify whether any of the second data sets is not new by identifying that the second GID of the second data set is equivalent to one of the first GIDs of one of the first data sets at the first system.

15. The system of claim 13 wherein to associate the first data set and the independently created data set as corresponding to each other, the synchronization server program is adapted to derive a global equivalency set from the first GID and the second GID associated therewith.

16. The system of claim 15, wherein the global equivalency set comprises a combination of the first and second GIDs.

17. The system of claim 13 wherein the synchronization server program is further adapted to:
store in memory one or more global equivalency sets each derived from one or more GIDs; and
identify whether any of the second data set is not new by identifying that one of the global equivalency sets stored in memory is derivative of the second GID of the second data set.

18. The system of claim 13 wherein the client is a second system for synchronization with the first system.

19. The system of claim 18 wherein the second system is selected from a group consisting of a desktop computer, a laptop computer, a personal digital assistant, a telephone, and a digital media player.

20. The system of claim 13 wherein each of the GIDs comprises a first identifier that uniquely corresponds to the system on which the GID has been generated.

21. The system of claim 20 wherein the first identifier of the GID comprises a Universally Unique Identifier.

22. The method of claim 20, wherein for the GID, the system on which the associated data set has been generated includes the system on which the associated data set was first created or last modified.

23. The system of claim 20, wherein each of the GIDs comprises a second identifier that identifies the associated data set on the system on which the data set has been generated.

24. The system of claim 23, wherein the second identifier comprises a record identifier identifying a record having data corresponding to the data set.

25. The system of claim 13 wherein the memory also has stored therein program instructions adapted to store the second data set on the first system upon identifying any of the second data sets as being a new and not independently created data set.

26. The system of claim 13, wherein each of the identity keys comprises a data element or property of the associated data set.

27. A system operable synchronization method comprising:
receiving at a first system from a client one or more second data sets, the first system having one or more first data sets, the one or more first data sets at the first system each having associated therewith a first global equivalency identification (GID) and each having one or more first identity keys related to first data of the first data set, the second data sets each having associated therewith a second GID and each having one or more second identity keys related to second data of the second data set, each of the first and second GIDs uniquely identifying its associated data set from among other data sets created on other systems;

identifying whether any of the second data sets is a new data set for the first system by determining if any of the second GIDs of the second data sets is not equivalent to any of the first GIDs of the first data sets at the first system;

upon identifying any of the second data sets as being a new data set for the first system, identifying whether any of the new data sets is an independently created data set at least similar to one of the first data sets at the first system by checking if at least one of the second identity keys of the new data set is at least similar to at least one of the first identity keys of at least one of the first data sets at the first system, each of the identity keys directly related to data of its associated data set;

upon identifying any of the second data sets as not being a new data set, identifying whether any of the not new data sets is changed by checking if at least one second property of the not new data set is different from at least one corresponding first property of at least one of the first data sets having associated therewith a first GID equivalent to the second GID of the not new data set;

if any of the new data sets is identified as being not independently created, storing the new data set on the first system;

if any of the new data sets is identified as being an independently created data set, associating the first data set and the independently created data set having at least similar first and second identity keys as corresponding to each other at the first system; and if any of the second data sets is identified as being not new and changed, updating the first data set having associated therewith the first GID equal to the second GID of the not new and changed second data set according to a conflicts resolution scheme.

28. The method of claim 27 wherein associating the first data set and the independently created data set as corresponding to each other further comprises deriving a global equivalency set from the first GID and the second GID associated therewith.

29. The method of claim 28, wherein the global equivalency set comprises a combination of the first and second GIDs.

30. The method of claim 27 further comprising storing in memory one or more global equivalency sets each derived from one or more GIDs, wherein identifying whether any of the second data set is a new data set for the first system comprises determining that any of the second data sets is not new by identifying that one of the global equivalency sets stored in memory is derivative of the second GID of the second data set.

31. The method of claim 27 wherein each of the GIDs comprises a first identifier that uniquely identifies the system on which the data set has been generated.

32. The method of claim 31 wherein the first identifier of the GID comprises a Universally Unique Identifier.

33. The method of claim 31, wherein for the GID, the system on which the associated data set has been generated includes the system on which the associated data set was first created or last modified.

34. The method of claim 31, wherein each of the GIDs comprises a second identifier that identifies the associated data set on the system on which the data set has been generated.

35. The method of claim 34, wherein the second identifier comprises a record identifier identifying a record having data corresponding to the data set.

36. The method of claim 27, wherein each of the identity keys comprises a data element or property of the associated data set.

37. A program storage device, readable by a programmable control device, comprising instructions stored on the program storage device for causing the programmable control device to perform a method according to claim 27.

* * * * *

UNITED STATES PATENT AND TRADEMARK OFFICE
CERTIFICATE OF CORRECTION

PATENT NO.        : 7,860,826 B2                               Page 1 of 1
APPLICATION NO.   : 11/462676
DATED             : December 28, 2010
INVENTOR(S)       : Gordie Freedman et al.

It is certified that error appears in the above-identified patent and that said Letters Patent is hereby corrected as shown below:

In column 3, line 50, delete "thereof," and insert -- thereof; --, therefor.

In column 18, lines 7-8, in Claim 5, delete "corresponds to the system on which the GID has been generated." and insert -- identifies the system on which the associated data set has been generated. --, therefor.

In column 19, lines 31-32, in Claim 20, delete "corresponds to the system on which the GID has been generated." and insert -- identifies the system on which the associated data set has been generated. --, therefor.

Signed and Sealed this
Twenty-second Day of November, 2011

David J. Kappos
*Director of the United States Patent and Trademark Office*